United States Patent [19]

Mino et al.

[11] Patent Number: 4,959,736
[45] Date of Patent: Sep. 25, 1990

[54] IMAGE SIGNAL PROCESSING METHOD AND APPARATUS WITH ELONGATED PICTURE ELEMENTS

[75] Inventors: Masayuki Mino; Osamu Yamada, both of Osaka, Japan

[73] Assignee: Minolta Camera Kabushiki Kaisha, Osaka, Japan

[21] Appl. No.: 291,565

[22] Filed: Dec. 29, 1988

[30] Foreign Application Priority Data

Dec. 29, 1987 [JP] Japan ................................ 62-334025
Jul. 8, 1988 [JP] Japan ................................ 63-171637

[51] Int. Cl.$^5$ ............................................. H04M 1/40
[52] U.S. Cl. .................................. 358/471; 358/474; 358/482; 358/447
[58] Field of Search ................... 358/162, 166, 213.11, 358/213.15, 213.23, 213.27, 213.28, 447, 448, 455, 471, 474, 482, 483; 382/43, 54, 58

[56] References Cited

U.S. PATENT DOCUMENTS 4,517,599  5/1985  Zwirn et al. ........................ 358/166
4,558,365  12/1985  Ochi ................................ 358/213.11
4,703,365  10/1987  Mumford ........................ 358/213.13

Primary Examiner—Edward L. Coles, Sr.
Attorney, Agent, or Firm—Price, Gess & Ubell

[57] ABSTRACT

An image signal processing method and apparatus includes elongated picture elements in a CCD linear image sensor to provide improved resolution. The outputs of the picture elements are converted into digital signals and are processed to compensate for the variance in photosensitivity of each of the individual picture elements.

11 Claims, 8 Drawing Sheets

IMAGE SIGNAL PROCESSING METHOD AND APPARATUS WITH ELONGATED PICTURE ELEMENTS

BACKGROUND OF THE INVENTION

1. Field of the Invention

The present invention relates to an image signal processing method for processing image signals detected by individual picture elements of a CCD (Charge Coupled Device) linear image sensor which is provided for reading an image of a document in an image reader.

2. Description of Related Art

In the image reader as mentioned above, a document is illuminated by a light source such as a halogen lamp or a fluorescent lamp and the reflected light therefrom is projected onto a CCD linear image sensor as a line image. Respective picture elements of the CCD linear image sensor receive the reflected light and convert it to individual image signals.

Figure 17:
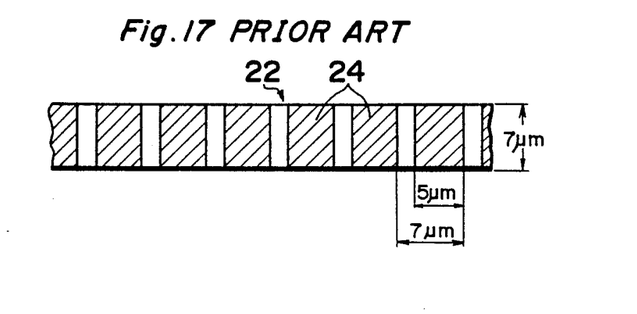
FIG. 17 is a plan view showing a photosensitive portion of a conventional CCD linear image sensor.

In a typical CCD linear image sensor, each picture element has such a small photosensitive area as is defined by $5 \times 7$ $\mu m^2$ and is aligned on a line at a pitch of 7 $\mu$ms as shown in FIG. 17.

In order to read an image with a high resolution, it is desirable to make the size of each picture element smaller. However, such a smaller size for the picture element invites a shortage in the amount of light being incident thereinto upon reading a document, and therefore, it becomes impossible to obtain an effective image signal therefrom.

In principle, it is not impossible to obtain effective image signals in the CCD image sensor by concentrating the illuminating light emitted from the light source on a line having a width of several $\mu$ms. However, in the case of a halogen lamp, the smallest width of the illuminating light is limited to an order of a few mms in the utmost because of limitations in positioning the filament in the halogen lamp and in fabricating the reflection mirror to be used for concentrating the illuminating light. In the case of a fluorescent lamp, the situation is worse than the case of the halogen lamp since the collection illumination with use of the former lamp is impossible in principle. Due to these reasons, it is very difficult to obtain a higher resolution of image even if an illuminating lamp having a high power is used.

SUMMARY OF THE INVENTION

An object of the present invention is to provide an image signal processing method for an image reader with a CCD linear image sensor which make it possible to narrow the pitch of picture elements thereof.

Another object of the present invention is to provide an image signal processing method suitable for a CCD linear image sensor having picture elements arranged in a main scan direction each of which has a configuration elongated in a subscan direction perpendicular to the main scan direction.

A further object of the present invention is to provide an image signal processing method which is capable of compensating a possible lowering in the resolution of image which may be caused in a subscan direction when such a CCD linear image sensor as mentioned above is used.

One more object of the present invention is to provide a CCD linear image sensor for an image reader which is suitable for performing the image signal processing method according to the present invention.

According to one aspect of the present invention, there is provided an image signal processing method for an image reader which reads an image of a document by scanning the document with the use of a CCD linear image sensor, wherein CCD picture elements are aligned in a main scan direction each of which has a photosensitive area elongated in a subscan direction perpendicular to the main scan direction, comprising the following steps: converting an analog signal outputted from each of said CCD picture elements of said CCD linear image sensor to a digital signal; Fourier-transforming the digital signal; multiplying the Fourier-transformed value by an inverse of a function representing the frequency characteristic of said CCD picture element or of an approximate function thereof; and obtaining an image data by Fourier-inverse-transforming the obtained product.

According to another aspect of the present invention, there is provided an image signal processing method for an image reader which reads an image of a document by scanning the document with the use of a CCD linear image sensor, wherein CCD picture elements are aligned in a main scan direction each of which has a photosensitive area elongated in a subscan direction perpendicular to the main scan direction, comprising the following steps: converting an analog signal outputted from each of said CCD picture elements of said CCD linear image sensor to a digital signal; storing the digital signal; reading out the stored digital signal and Fourier-transforming the read out digital signal; multiplying the Fourier-transformed value by an inverse of a function representing the frequency characteristic of said CCD picture element or of an approximate function thereof; and obtaining an image data by Fourier-inverse-transforming the obtained product.

According to a further aspect of the present invention, there is provided a CCD linear image sensor for an image reader comprising CCD picture elements aligned in a main scan direction, in which the photosensitivity of each of said CCD picture elements is varied stepwise or continuously in a subscan direction perpendicular to the main scan direction.

The light of the light source can be efficiently utilized by elongating the photosensitive area of each of the CCD picture elements in the subscan direction, resulting in a light source of a small watt number can be used in the image reader and the manufacturing cost of the image reader can be reduced. On the other hand, the reduction of the quality of the reading image caused by elongating the photosensitive area in the subscan direction can be compensated by the aforementioned arithmetic processing, resulting in the level of contrast and resolution of the reading image not decrease.

In the image reader with use of the CCD linear image sensor comprising the photosensitive area elongated in the subscan direction for utilizing the light of the light source effectively and performing the image compensation arithmetic processing for improving the reduced reading density of the subscan direction, the effective frequency domain in which the image compensation arithmetic processing can be performed properly can be extended and efficient reading density can be obtained.

BRIEF DESCRIPTION OF THE DRAWINGS

This invention may be better understood and its numerous objects and advantages will become apparent to those skilled in the art by reference t the accompanying drawings as follows:

FIG. 5b is a graph showing the characteristic of the response of the general transformation system shown in FIG. 5a.

FIG. 8 is a graph showing the frequency characteristic of the response function H($\omega$) of the general system shown in FIG. 5a;

FIG. 9 is a graph showing the frequency characteristic of the response function H(N) of the general system shown in FIG. 5a;

FIG. 14b is a graph showing the characteristic of the light intensity of the CCD linear image sensor shown in FIG. 14a;

FIG. 15b is a graph showing the characteristic of the light intensity of the CCD linear image sensor shown in FIG. 15a;

FIG. 16 is a graph showing the frequency characteristic of the CCD linear image sensors shown in FIGS. 13, 14a and 15a.

DETAILED DESCRIPTION OF THE PREFERRED EMBODIMENTS

The First Preferred Embodiment

Figure 1:
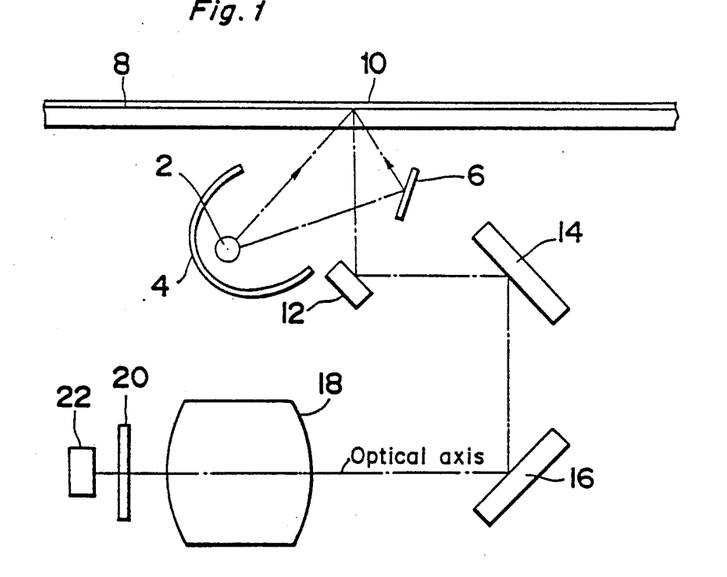
FIG. 1 is a schematic diagram showing an optical system of an image reader according to the preferred embodiment of the present invention.

FIG. 1 shows a mirror scan type optical system of an image reader according to the first preferred embodiment of the present invention.

In FIG. 1, the light emitted by a halogen lamp 2 illuminates a document 10 positioned on a glass plate 8 through reflection mirrors 4 and 6. The image of the document 10 is reflected in order by mirrors 12, 14 and 16 and the image is incident into the CCD linear image sensor 22 through a lens 18 and a filter 20, and then the image of the document 10 is formed on the CCD linear image sensor 22. When the halogen lamp 2, the reflection mirrors 4 and 6, and the mirror 12 are moved as one body, the document 10 is scanned, and also the mirrors 14 and 16 are moved at the same time at a half speed of the movement speed of the halogen lamp 2, the reflection mirrors 4 and 6 and the mirror 12 so as to make the optical path length from the halogen lamp 2 to the lens 18 constant.

Figure 2:
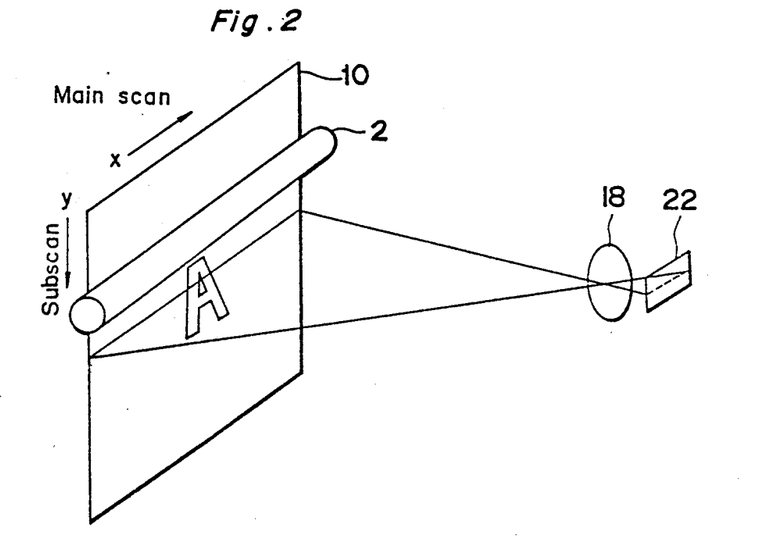
FIG. 2 is a perspective view showing the scanning of the whole image in the optical system of the image reader shown in FIG. 1.

FIG. 2 is a perspective view of the optical system shown in FIG. 1 showing the reading method of the whole image. In FIG. 2, the scan direction of the document 10 when the components 2, 4, 6, 12, 14 and 16 of the optical system are moved is referred to hereinafter as the subscan direction. Each picture element of CCD linear image sensor 22 outputs an image signal corresponding to a light image incident thereto along a direction (which is referred to hereinafter as the main scan direction) which is perpendicular to the subscan direction. The whole image of the document 10 can be read by scanning the document 10 in both of the main scan and subscan directions.

As the method for scanning a document mechanically, the method for moving the manuscript itself in the main scan direction while the document is illuminated may be used as well as the method shown in FIG. 2, and also the method for moving the CCD linear image sensor while the whole image of the document is projected on a surface by a lens may be used.

Figure 3:
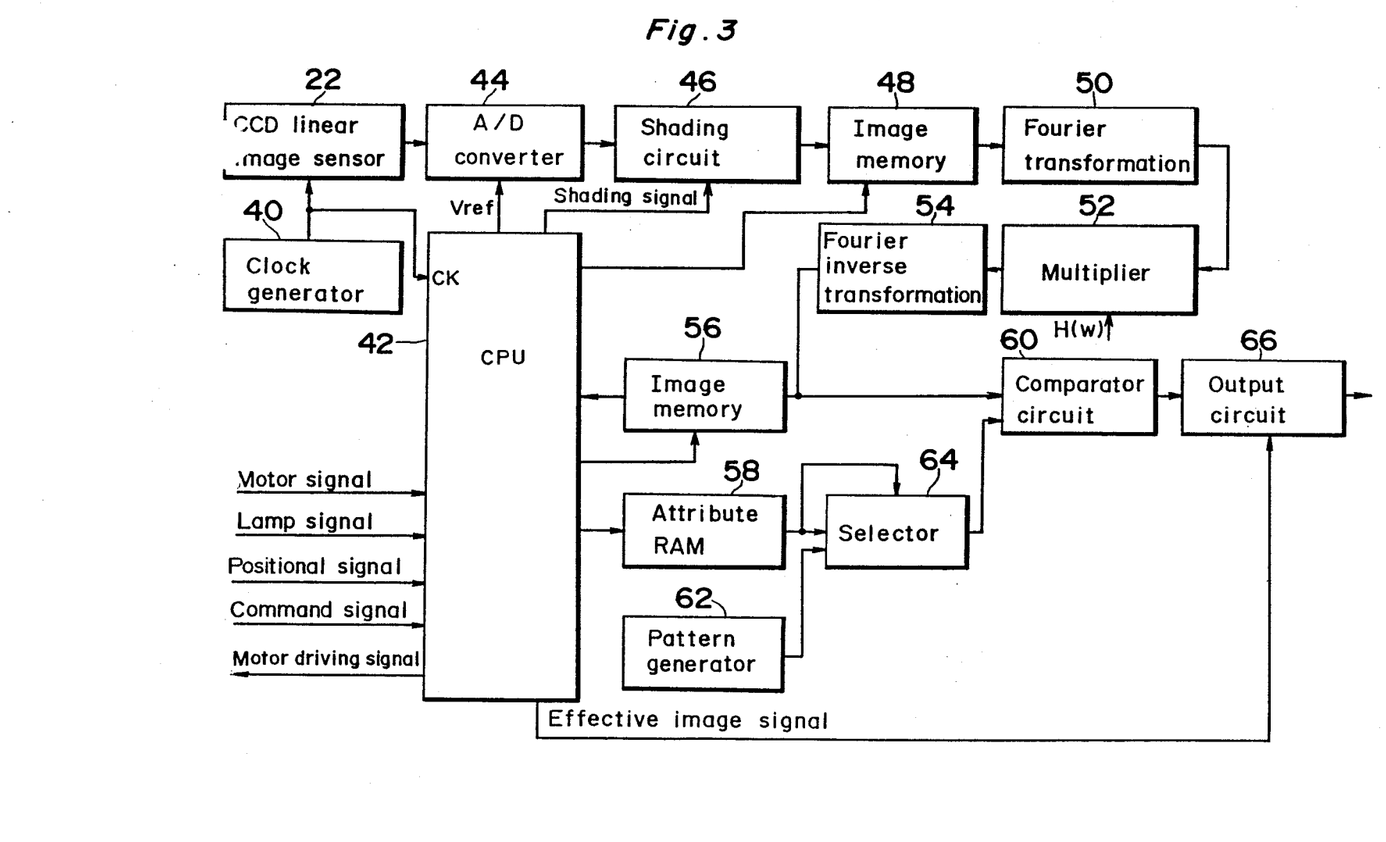
FIG. 3 is a schematic diagram of a circuit system of the image reader shown in FIG. 1.

FIG. 3 is a schematic diagram of a circuit system of the image reader shown in FIGS. 1 and 2.

In FIG. 3, a clock signal generator 40 outputs a sample and hold signal to the CCD linear image sensor 22 and the sample and hold signal is also input as a clock signal to a CPU 42 provided for controlling the reading of the document 10. When a slit-like line image reflected from the document 10 is input into the CCD linear image sensor 22, each picture element thereof outputs an analog electric signal corresponding to a light image incident thereto. An analog/digital converter 44 connected to the CCD linear image sensor 22 converts the individual analog electric signals outputted from the CCD linear image sensor 22 to digital signals. A shading circuit 46 corrects the nonuniformity of the light amount in the main scan direction based on the digital signal outputted from the analog/digital converter 44 and also corrects the converted digital signals based on the output properties of the picture elements of the CCD linear image sensor 22, wherein the operating timing of the shading circuit 46 is given by a shading signal outputted from the CPU 42. The output signal of the shading circuit 46 is input into an image memory 48. The image memory 48 is a random access memory (which is referred to hereinafter as the RAM) for storing all of the read data of the document 10.

After the reading data of one page is stored in the image memory 48, a Fourier transforming section 50 Fourier-transforms the read data g(y) on one line in the subscan direction to the frequency characteristic G(ω). Next, a multiplier 52 multiplies the frequency characteristic G(ω) by the inverse 1/H(ω) of the frequency characteristic of the response of the system so as to obtain the frequency characteristic F(ω), wherein the system corresponds to each of the picture elements of the CCD linear image sensor 22 as described below in detail. The inverse 1/H(ω) is given by the length $l_b$ of the photosensitive portion 24 of the CCD linear image sensor 22 and the spatial frequency N in the subscan direction as shown in an equation (5) described below, and a proper approximate function may be used instead of the inverse 1/H(ω).

Next, after a Fourier inverse transforming section 54 receives the frequency characteristic F(ω), the Fourier inverse transforming section 54 performs the Fourier inverse transformation of the frequency characteristic F(ω) and outputs the data of the Fourier inverse transformation of the frequency characteristic F(ω) to an image memory 56. The aforementioned arithmetic processing is repeatedly performed at each position y in the subscan direction. Thus, the image reading data of one page which is arithmetically processed as described above is stored in the image memory 56.

In the aforementioned explanation, two image memories 48 and 56 are used for convenience, however, in practice, the aforementioned arithmetic processing can be performed by using only one image memory. Furthermore, the CPU 42 determines the attribute of binary digital or dither of the image data by a predetermined region according to the image data which is stored in the image memory 56 and stores the determined attribute to an attribute RAM 58.

Next, the binary digital processing is performed as well as the conventional example and the processed image data is outputted to an external apparatus. That is, the image memory 56 outputs the read data which is arithmetically processed as described above to a comparator circuit 60 in order. A pattern generator 62 generates a threshold value when the attribute of dither is selected, wherein the threshold value is generated as a m×n matrix. A selector 64 switches over to the threshold value of binary digital or the threshold value of dither in accordance with the attribute data outputted from the attribute RAM 58 when the data is transferred and the selector 64 outputs the selected threshold value to the comparator circuit 60. The comparator circuit 60 compares the image reading data which is arithmetically processed with the threshold value outputted from the selector 64 and outputs the compared result data to an output circuit 66 in the form of one bit. When the output circuit 66 receives an effective image signal which is a synchronizing signal from the CPU 42, the output circuit 66 outputs the image signal of one bit and the synchronizing signal to the external apparatus such as a printer etc..

Furthermore, the CPU 42 controls the operation of the image reader in accordance with a motor signal, a lamp signal, a positional signal and a command signal etc..

Figure 4:
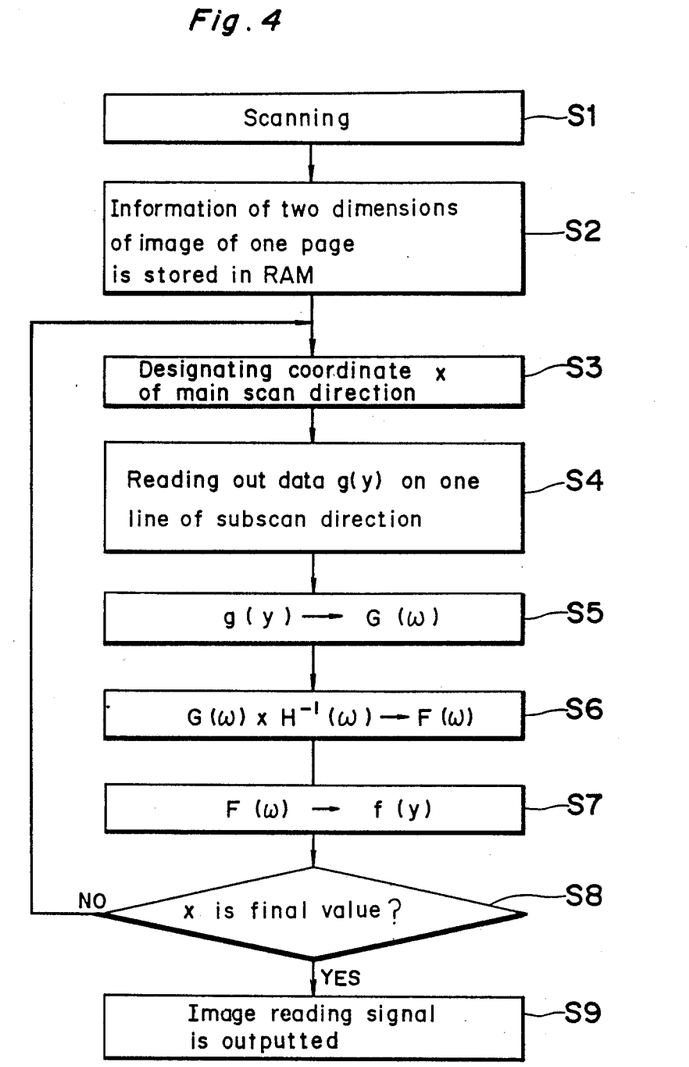
FIG. 4 is a flow chart showing the arithmetic processing of the image reader shown in FIG. 3.

FIG. 4 shows a processing procedure of the image reader shown in FIG. 3.

In FIG. 4, first of all, at step S1, the whole image of the document 10 is scanned by the optical system, and at step S2, the information of two dimensions of the image of one page is stored in the image memory 48. Next, at step S3, a coordinate value x of the main scan direction is designated, and at step S4, the read data g(y) on one line in the subscan direction is read out from the image memory 48. At step S5, the frequency characteristic G(ω) is obtained by performing the Fourier transformation of the read data g(y).

Furthermore, at step S6, the frequency characteristic F(ω) is obtained by multiplying the frequency characteristic G(ω) by the inverse {1/H(ω)} of the frequency characteristic in the subscan direction of the photosensitive portion 24. Next, at step S7, the image data f(y) is obtained by performing the Fourier inverse transformation of the frequency characteristic F(ω) and the image data f(y) is stored in the image memory 56.

Furthermore, at step S8, it is judged whether or not the coordinate value x of the main scan direction is the final value. If it is judged that the coordinate value x is not the final value, the program flow goes to step S3, the coordinate value x is changed and the aforementioned processings from step S4 to S7 are performed. On the other hand, at step S8, if it is judged that the coordinate value x is the final value, i.e., the processings from step S4 to S7 of all of the coordinate values x are completed, the image reading signal f(y) is outputted from the image memory 56 at step S9. Furthermore, the image reading signal f(y) is converted into the binary digital signal and the binary digital signal of the image reading signal f(y) is outputted into an external printer etc..

The frequency characteristic can be improved by multiplying the frequency characteristic G(ω) by the inverse {1/H(ω)} of the frequency characteristic of the photosensitive portion 24 in the subscan direction, even though the image is read by a CCD linear image sensor comprising the picture elements having a small size. It should be noted that the same effect as that of the aforementioned method can be obtained by performing the arithmetic processing for increasing the value at a high frequency approximately instead of multiplying the frequency characteristic G(ω) by the inverse {1/H(ω)} of the frequency characteristic of the photosensitive portion.

Figure 5A:
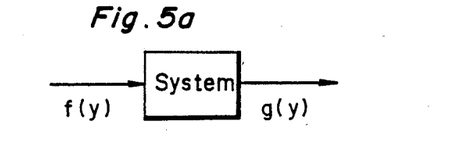
FIG. 5a is a schematic diagram of a general transformation system.

FIG. 5a is a schematic diagram showing a general transformation system corresponding to each picture element of the CCD linear image sensor 22.

Figure 5B:
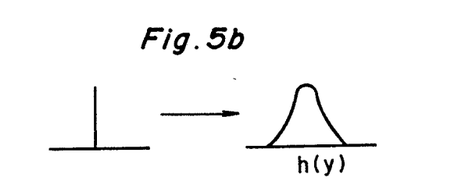

As shown in FIG. 5a, it is assumed that when a function signal f(y) is input to the system, a function signal g(y) is outputted from the system. As shown in FIG. 5b, when an impulse signal having zero width (corresponding to a point light) is input to the system shown in FIG. 5a, a function signal h(y) is outputted from the system. This function h(y) is considered to show the characteristic of the system shown FIG. 5a.

The frequency characteristics F(ω), G(ω) and H(ω) of these functions f(y), g(y) and h(y) can be obtained by performing the Fourier transformation of the functions f(y), g(y) and h(y) as follows:

$$F(\omega) = \int_{-\infty}^{\infty} f(y) \exp(-i\omega y) dy \quad (1a)$$

$$G(\omega) = \int_{-\infty}^{\infty} g(y) \exp(-i\omega y) dy \quad (1b)$$

$$H(\omega) = \int_{-\infty}^{\infty} h(y) \exp(-i\omega y) dy \quad (1c)$$

The frequency characteristic G(ω) of the output g(y) is expressed by the product of the frequency characteristic F(ω) of the input f(y) and the frequency characteristic H(ω) of the system as follows:

$$G(\omega) = F(\omega) \cdot H(\omega) \quad (2)$$

The Fourier inverse transformations for transforming the frequency characteristics F(ω), G(ω) and H(ω) to the respective functions f(y), g(y) and h(y) are expressed as follows:

$$f(y) = \frac{1}{2\pi} \int_{-\infty}^{\infty} F(\omega) \exp(i\omega y) d\omega \quad (3a)$$

$$g(y) = \frac{1}{2\pi} \int_{-\infty}^{\infty} G(\omega) \exp(i\omega y) d\omega \quad (3b)$$

$$h(y) = \frac{1}{2\pi} \int_{-\infty}^{\infty} H(\omega) \exp(i\omega y) d\omega \quad (3c)$$

Figure 6:
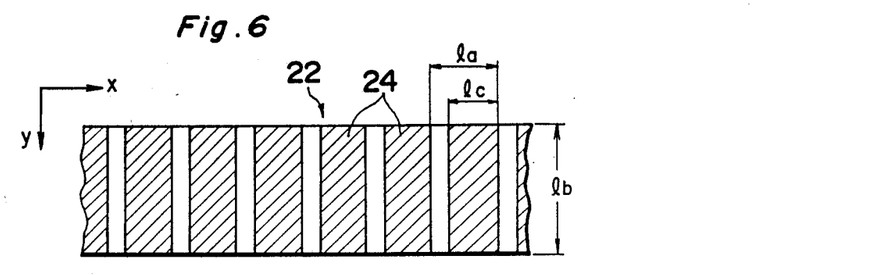
FIG. 6 is a plan view showing a photosensitive portion of a CCD linear image sensor in the image reader shown in FIG. 1.

FIG. 6 shows one example of the shape of the photosensitive portions 24 of the CCD linear image sensor 22.

In FIG. 6, the oblique line portion represents the photosensitive portion 24 of each of the picture elements, wherein the length $l_b$ of the photosensitive portion 24 in the y direction is larger than the pitch $l_a$ in the x direction, wherein the x direction corresponds to the main scan direction and the y direction corresponds to the subscan direction. For example, $l_b = 14$ μm, $l_a = 7$ μm and $l_b/l_a = 2$. The width $l_c$ of the photosensitive portion 24 is smaller than the pitch $l_a$ in order to separate each of the picture elements. For example, $l_c = 5$ μm.

The amount of the incident light increases by elongating the photosensitive portion 24 in the subscan direction. However, the contrast and the resolution in the subscan direction are reduced and the quality of the image read by the image reader deteriorates. In order to overcome the aforementioned disadvantages, the arithmetic processing mentioned below is performed.

Figure 7:
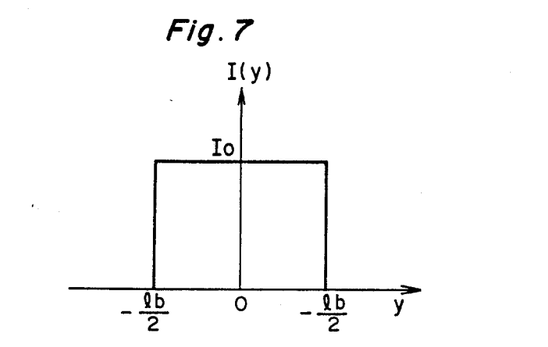
FIG. 7 is a graph showing the characteristic of the light intensity of the photosensitive portion of the CCD linear image sensor shown in FIG. 6.

First of all, the response characteristic of the CCD linear image sensor 22 will be described below. The characteristic of the light intensity I of the photosensitive portion 24 of the CCD linear image sensor 22 shown in FIG. 6 is an impulse function ideally, however, in practice, the characteristic of the light intensity I of the photosensitive portion 24 of the CCD linear image sensor 22 becomes a rectangular shape as shown in FIG. 7 because of the effect of the mechanical movement of the optical system and the shape of the photosensitive portion 24. The characteristic of the light intensity of the photosensitive portion 24 of CCD linear image sensor 22 is expressed as follows:

$$\begin{aligned} I(y) &= 0 & (y < -l_b/2) \\ &= I_0 & (-l_b/2 \leq y \leq l_b/2) \\ &= 0 & (l_b/2 < y) \end{aligned} \quad (4)$$

wherein $l_b$ is the length of the photosensitive portion 24 in the y direction.

The photosensitive portion 24 of each of the picture elements of the CCD linear image sensor 22 is mechanically scanned even during detection thereby. However, since the scan time of one picture element is about 0.1 microsecond and the mechanical scan speed of the subscan direction is about 100 mm/second generally, only the length of about 0.01 μm is scanned for 0.1 microsecond. Since this length scanned for 0.1 microsecond is sufficiently smaller than the length of the sensor 22, 14 μm, the length scanned for 0.1 microsecond is ignored herein.

In the aforementioned theory of the response of the general transformation system, the rectangular function I(y) corresponds to the aforementioned function h(y). Therefore, the function H(ω) representing the frequency characteristic of the system can be obtained by performing the Fourier transformation of I(y). That is, the function H(ω) is expressed as follows:

$$H(\omega) = \sin \pi\omega / \pi\omega \quad (5)$$

wherein $\omega = l_b \cdot N$.

wherein $l_b$ is the actual length of the photosensitive portion 24 in the y direction in the unit of mm, and N is the spatial frequency in the unit of line/mm.

Figure 8:
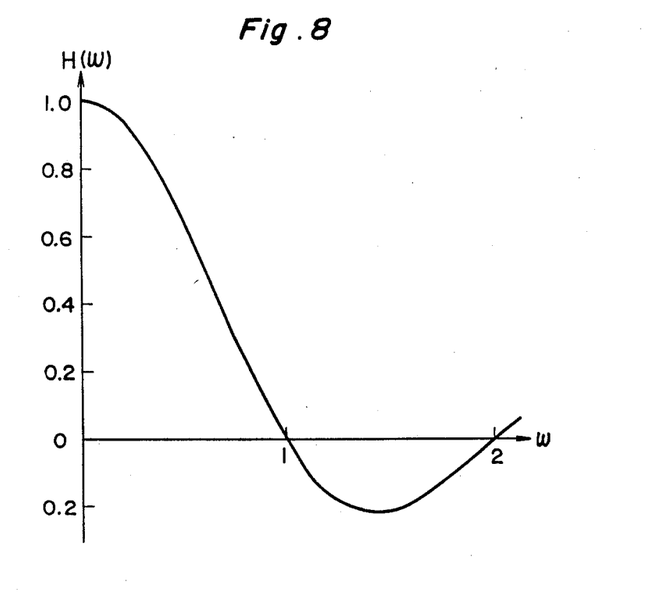

FIG. 8 shows the frequency characteristic of the function H(ω). As shown in FIG. 8, properly, the contrast is reduced at a high frequency.

Figure 9:
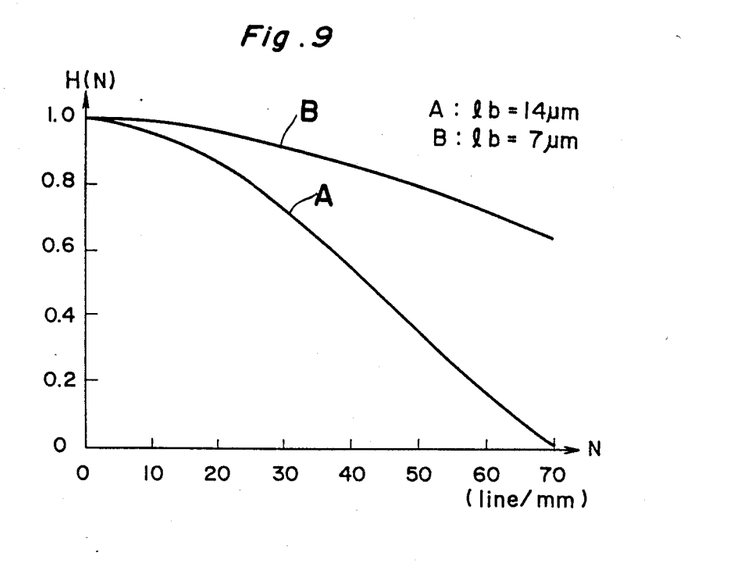

The function H(ω) will be described below concretely by applying the actual spatial frequency N to the function H(ω). FIG. 9 shows the frequency characteristic H(N) when the lengths $l_b$ of the photosensitive portion 24 in the subscan direction are 14 μm (curve A) and 7 μm (curve B). As shown in FIG. 9, when the angular frequency $\omega = l_b \cdot N = 1$, the function H(ω) becomes zero. In this case, when $l_b = 14$ μm, the spatial frequency N is 71 line/mm, on the other hand, when $l_b = 7$ μm, the spatial frequency N is 143 line/mm. A fine type image reader has a reading density of 400 dot/inch generally. This reading density of 400 dot/inch corresponds to the spatial frequency N of 8 line/mm. When the number of the photosensitive portions 24 of the CCD linear image sensor 22 is 5000 and the pitch thereof is 7 μm, the length of the CCD linear image sensor 22 in the main scan direction is 35 mm. When an image of a size A3 having a length of 297 mm is projected on the CCD linear image sensor 22 with a reduction, the reduction ratio becomes as follows:

$$\frac{35}{297} = \frac{1}{8.5}$$

The reading density of 8 line/mm corresponds to the spatial frequency N of 68 line/mm. Therefore, when the CCD linear image sensor 22 having a length $l_b$ of 14 μm has the spatial frequency of 71 line/mm, the CCD linear image sensor 22 can attain the reading density of 400 dot/inch theoretically. However, practically, the CCD linear image sensor 22 may not attain the aforementioned reading density. Therefore, it is to be desired that the CCD linear image sensor 22 has a higher reading density.

When the length $l_b$ of the photosensitive portion 24 in the y direction becomes twice as long as the original length $l_b$ of 7 μm, the following equation can be obtained from the equation (5) which is obtained by performing the Fourier transformation of the equation (4) representing the rectangular characteristic of the light intensity.

$$\sin(\pi \cdot 2l_b \cdot N)/\pi \cdot 2l_b \cdot N / \{\sin(\pi \cdot l_b \cdot N)/\pi \cdot l_b \cdot N\} = \cos(\pi \cdot l_b \cdot N) = \cos(0.022N)$$

With the same spatial frequency N, the value of the frequency characteristic of the CCD linear image sensor having the length $2l_b$ becomes cos(0.022N) times as large as the value of the frequency characteristic of the CCD linear image sensor having the length $l_b$. Therefore, the equation of the frequency characteristic (shown in the curve B of FIG. 9) of the CCD linear image sensor having a length of 7 μm can be obtained by multiplying the equation of the frequency characteristic (shown in curve A of FIG. 9) of the CCD linear image sensor having a length of 14 μm by the inverse 1/cos(0.022N). The photo detecting area increases by elongating the photosensitive portion 24 in the subscan direction, resulting in that the sensitivity of photo detecting increases. Then, the reduction of the resolution can be prevented by performing the aforementioned arithmetic processing, although the resolution in the subscan direction decreases in the conventional example.

In the aforementioned explanation, the rectangular characteristic of the light intensity is used. Generally, the input function f(y) is obtained from the output function g(y) of the light characteristic by using the function H(ω) representing the frequency characteristic of the system. Therefore, the frequency characteristic lowered by elongating the photosensitive portion 24 of the CCD linear image sensor 22 can be improved. Then, the following equation is used.

$$G(\omega) \times \{1/H(\omega)\} = F(\omega) \cdot H(\omega) \cdot \{1/H(\omega)\} \quad (6)$$
$$= F(\omega)$$

That is, the function G(ω) is obtained by performing the Fourier transformation of the output function g(y) according to the equation (1b), the function F(ω) is obtained by multiplying the function G(ω) by the inverse of the function H(ω) according to the equation (6), and the original image input function f(y) can be obtained by performing the Fourier inverse transformation of the function F(ω) according to the equation (3a).

As apparent from the equation (6), the aforementioned improving method of the frequency characteristic is effective only in the case of H(ω)≠0. That is, in the method for compensating the quality of image by performing the aforementioned arithmetic processing, when the value of the frequency characteristic becomes zero, the inverse of the value can not be calculated, and it is impossible to perform the Fourier inverse transformation. Furthermore, in case the inverse is calculated when the value of the frequency characteristic is close to zero, the calculation error increases, resulting in that it is impossible to calculate the proper value and the original input image can not be properly reproduced. That is, the aforementioned method is limited to the frequency domain in which the value of the frequency characteristic is not zero.

In the aforementioned first preferred embodiment, the image reader for outputting the image data to the printer etc. is described, and the binary digital processing of the analog/digital converted image data is performed and the processed image data is outputted. However, the present invention can be applied to the case where multi-valued image data obtained by the image reader is outputted to an external apparatus such as a computer.

THE SECOND PREFERRED EMBODIMENT

In the second preferred embodiment, the frequency domain is extended by utilizing the phenomenon that the frequency characteristic increases at a high frequency if the sensitivity of the photosensitive portion of the CCD linear image sensor has such a distribution that the sensitivity decreases from the center portion to the end portions of the photosensitive portion along the subscan direction. The CCD linear image sensor having the aforementioned sensitivity distribution is formed by using an optical filter or using the photosensitive portion having a changed shape. The present invention is not limited to the aforementioned forming method of the sensitivity distribution.

Figure 10:
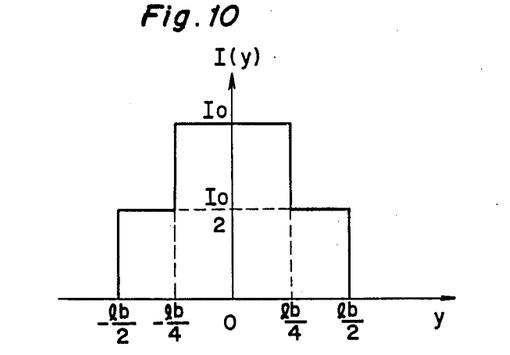
FIG. 10 is a graph showing the characteristic of the light intensity of the CCD linear image sensor having a sensitive distribution of the second preferred embodiment according to the present invention.
Figure 11:
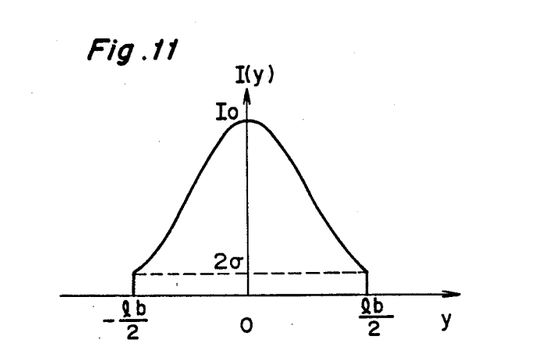
FIG. 11 is a graph showing the characteristic of the light intensity of the CCD linear image sensor having a sensitive distribution of the second preferred embodiment according to the present invention.

FIGS. 10 and 11 are graphs showing the sensitivity characteristics of respective photosensitive portions of CCD linear image sensors to each of which a sensitivity distribution is given by an optical filter.

An optical filter is uniformly formed on the photosensitive portion 24 of the CCD linear image sensor 22 by vapor deposition method so that the sensitivity of the center portion of the photosensitive portion 24 of the CCD linear image sensor 22 shown in FIG. 6 having a width of 7 μm in the subscan direction has a sensitivity of 1 and both of the side portions of the photos sensitive, portion 24 each having a width of 3.5 μm in the subscan direction has a sensitivity of 0.5, resulting in that the sensitivity characteristic changes stepwise as shown in FIG. 10.

FIG. 11 shows the sensitivity characteristic of the photosensitive portion 24 of the CCD linear image sensor 22 shown in FIG. 6 having a Gaussian distribution (normal distribution) where the sensitivity of each of the end portions of the photosensitive portion 24 is 2σ, wherein σ is standard deviation of the Gaussian distribution. In this case, an optical filter is formed on the whole surface of the photosensitive portion 24, adjusting the thickness of the film of the optical filter by linear control method so that the sensitivity distribution of the photosensitive portion 24 has the Gaussian distribution.

Figure 12:
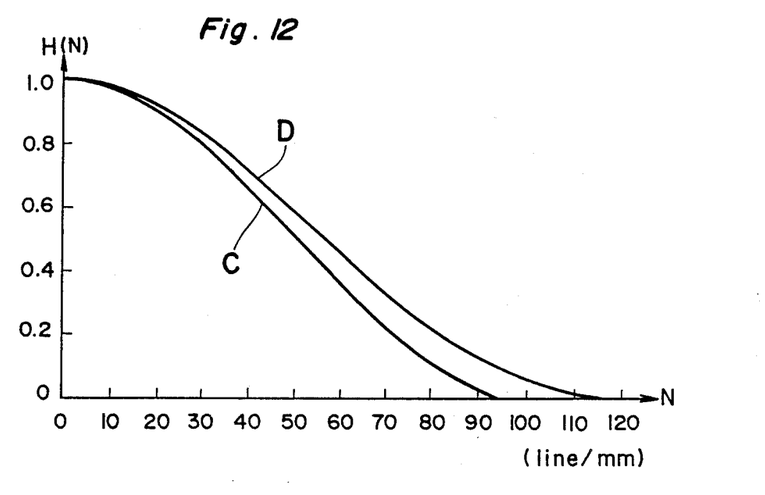
FIG. 12 is a graph showing the frequency characteristics H(N) of the CCD linear image sensors having the sensitive distribution shown in FIGS. 10 and 11.

FIG. 12 is a graph showing the frequency characteristic H(N) obtained by performing the Fourier transformation of the equation representing the sensitivity distribution shown in FIGS. 10 and 11. As shown in FIG. 12, the spatial frequency N obtained when H(N)=0 is 95 line/mm in the case of the sensitivity distribution shown in FIG. 10, and the spatial frequency N obtained when H(N)=0 is 115 line/mm in the case of the sensitivity distribution shown in FIG. 11. On the other hand, in the conventional CCD linear image sensor 22 having the uniform sensitivity distribution shown in FIG. 7, i.e., having the rectangular sensitivity characteristic, the spatial frequency N obtained when H(N)=0 is 71 line/mm. Therefore, the frequency characteristics at a high frequency of the CCD linear image sensors 22 having the sensitivity distributions shown in FIGS. 10 and 11 are larger than that of the conventional CCD linear image sensor 22.

The aforementioned optical filter is formed by laminating a high refraction material and a low refraction material on a glass substrate made of BK7, white potassium nitrate, wherein the high refraction material is $TiO_2$, $ZnO_2$, $CeO_2$, $HfO_2$, ZnS etc., and the low refraction material is $SiO_2$, $MgF_2$, $Na_3AlF_6$ etc..

Figure 14A:
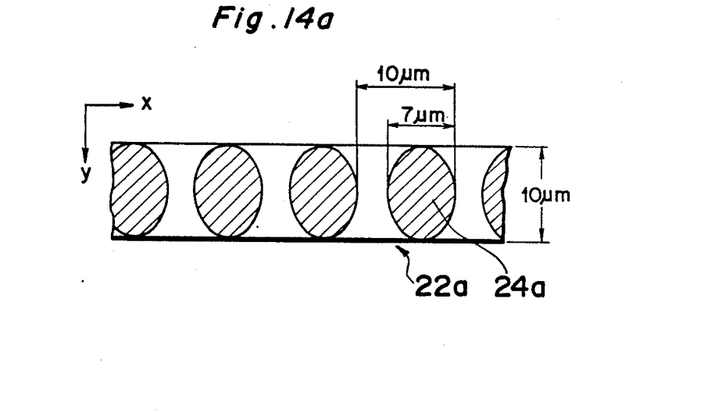
FIG. 14a is a plan view showing a photosensitive portion having a elliptical shape of a CCD linear image sensor of the second preferred embodiment according to the present invention.
Figure 15A:
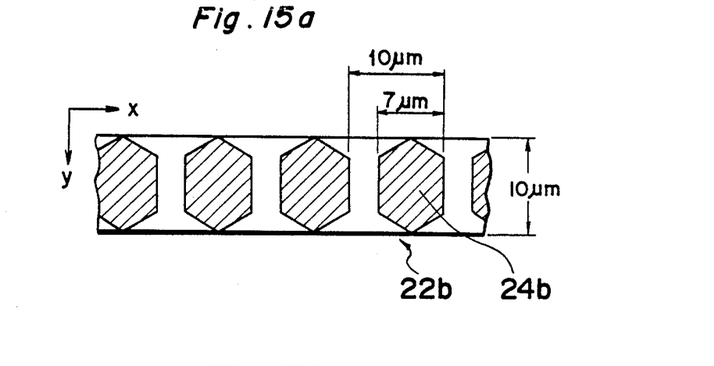
FIG. 15a is a plan view showing a photosensitive portion having a hexagonal shape of a CCD linear image sensor of the second preferred embodiment according to the present invention.

FIGS. 14a and 15a show CCD linear image sensors 22a and 22b comprising other photosensitive portions 24a and 24b having an elliptical shape and a hexagonal shape, respectively.

Figure 14B:
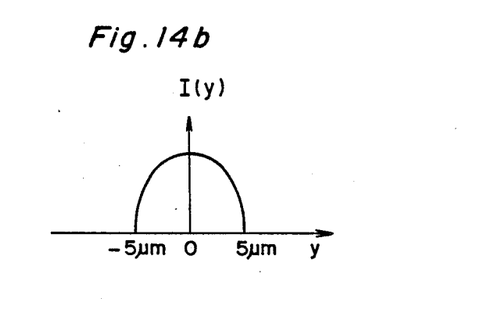

In FIG. 14a, one picture element of the CCD linear image sensor 22a measures 10 μm by 10 μm and the photosensitive portion 24a thereof has an elliptical shape having a long axis in the subscan direction. FIG. 14b shows the sensitivity characteristic of the CCD linear image sensor 22a.

Figure 15B:
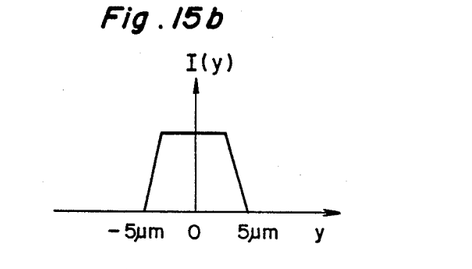

In FIG. 15a, one picture element of the CCD linear image sensor 22b measures 10 μm by 10 μm and the photosensitive portion 24b thereof has a hexagonal shape. FIG. 15b shows the sensitivity characteristic of the CCD linear image sensor 22b.

Figure 13:
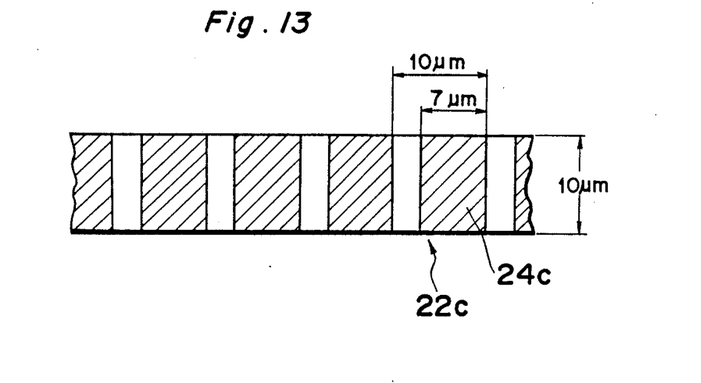
FIG. 13 is a plan view showing a photosensitive portion of a CCD linear image sensor of a comparative example.

FIG. 13 shows a CCD linear image sensor 22c of a comparative example for comparing the characteristics of the CCD linear image sensor 22c with those of the CCD linear image sensors 22a and 22b, wherein one picture element of the CCD linear image sensor 22c has the same size as that of the CCD linear image sensors 22a and 22b and the photosensitive portion 24c of the CCD linear image sensor 2c measures 7 μm by 10 μm.

Figure 16:
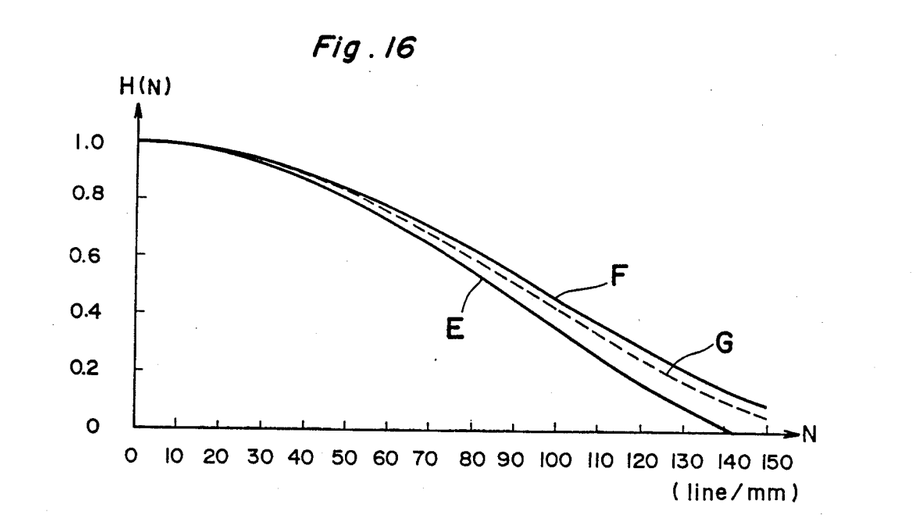

FIG. 16 is a graph showing the frequency characteristics of the CCD linear image sensors 22a, 22b and 22c respectively shown in FIGS. 14a, 15a and 13, wherein the characteristic curves E, F and G show the frequency characteristics of the CCD linear image sensors 22c, 22a and 22b shown in FIGS. 13, 14a and 15a, respectively. As shown in FIG. 16, the frequency domain of the CCD linear image sensor 22c shown in FIG. 13 extends to 143 line/mm; on the other hand, the frequency domains of the CCD linear image sensors 22a and 22b respectively shown in FIGS. 14a and 15a extend to the spatial frequency larger than 150 line/mm.

As described above, a sensitivity distribution can be given to the picture element of the CCD linear image sensor by changing the shape of the photosensitive portion of the CCD linear image sensor, i.e., concretely, by narrowing the width of the photosensitive portion with the approach from the center portion to the end portions of the photosensitive portion along the subscan direction, resulting in that the frequency characteristic increases and the effectively utilized frequency domain can be extended.

The reduction of the quantity of the read image data can be compensated by using the CCD linear image sensor comprising the photosensitive portion to which the aforementioned sensitivity distribution is given and by using the processing procedure of the first preferred embodiment shown in FIG. 4. In the second preferred embodiment, the image data obtained by the CLD image sensor according to the second preferred embodiment can be processed with use of the circuit system as shown in FIG. 3.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An image signal processing method for an image reader which reads an image of a document by scanning the document with the use of a CCD linear image sensor, wherein CCD picture elements are aligned in a main scan direction, each of which has a photosensitive area elongated in a subscan direction perpendicular to the main scan direction, comprising the following steps:
   converting an analog signal outputted from each of said CCD picture elements of said CCD linear image sensor to a digital signal;
   Fourier-transforming the digital signal;
   multiplying the value obtained by Fourier-transformation by an inverse of a function representing a frequency characteristic of said CCD picture element or an approximate function of said inverse function, said frequency characteristic depending on the length of the photosensitive area of the CCD picture element in the subscan direction and a spatial frequency N in the subscan direction; and
   obtaining an image data by Fourier-inverse-transforming the obtained product.

2. An image signal processing method for an image reader which reads an image of a document by scanning the document with the use of a CCD linear image sensor, wherein CCD picture elements are aligned in a main scan direction, each of which has a photosensitive area elongated in a subscan direction perpendicular to the main scan direction, comprising the following steps:
   converting an analog signal outputted from each of said CCD picture elements of said CCD linear image sensor to a digital signal;
   storing the digital signal;
   reading out the stored digital signal and Fourier-transforming the read out digital signal;
   multiplying the value obtained by Fourier-transformation by an inverse of a function representing a frequency characteristic of said CCD picture element or an approximate function of said inverse function, said frequency characteristic depending on the length of the photosensitive area of the CCD picture element in the subscan direction and a spatial frequency N in the subscan direction; and
   obtaining an image data by Fourier-inverse-transforming the obtained product.

3. A CCD linear image sensor for an image reader comprising CCD picture elements aligned in a main scan direction, in which the photosensitivity of each of said CCD picture elements is varied stepwise or continuously in a subscan direction perpendicular to the main scan direction.

4. The image sensor of claim 3 wherein each picture element has a hexagonal configuration.

5. The image sensor of claim 3 wherein the photosensitivity of each picture element decreases from a center portion thereof to end portions thereof along the subscan direction.

6. The image sensor of claim 3 wherein each picture element has an elliptical configuration.

7. The image sensor of claim 3 wherein the photosensitivity of each picture element is varied by means of an optical filter.

8. The image sensor of claim 3 wherein each picture element is elongated in the subscan direction relative to the main scan direction.

9. The image sensor of claim 7 wherein the optical filter includes a high refraction material laminated to a low refractive material.

10. In an image sensor device that can scan a document with a multiple picture element CCD image sensor, having a narrow pitch for the picture elements, to provide image data, the improvement comprising:
    means for varying the photosensitivity of the picture elements in a specific dimensional direction relative to another direction;
    means for providing output signals from the picture elements, and
    arithmetic processing means for compensating for the effect of the variance in photosensitivity on the output signals to maintain a predetermined resolution.

11. The image sensor device of claim 10 wherein the arithmetic processing means performs a Fourier transform of the output signals, a multiplication of the Fourier transformed values by an inverse of a function representing an approximate frequency characteristic of the CCD picture elements to provide obtained products and a Fourier-inverse transforming of the obtained products.

* * * * *